Feb. 18, 1969

HARUO KATAYAMA 3,428,367

AIR BRAKE SYSTEM FOR AUTOMOBILES

Filed May 20, 1966

INVENTOR

HARUO KATAYAMA

BY

ATTORNEY

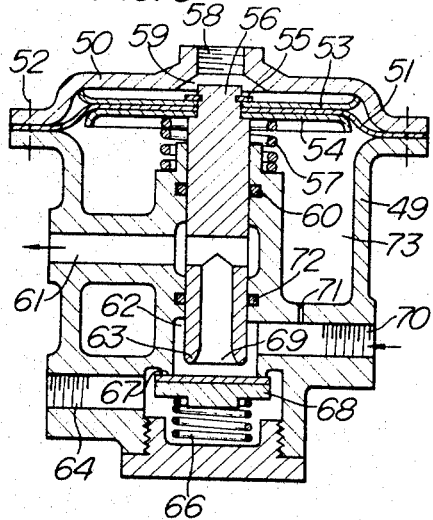
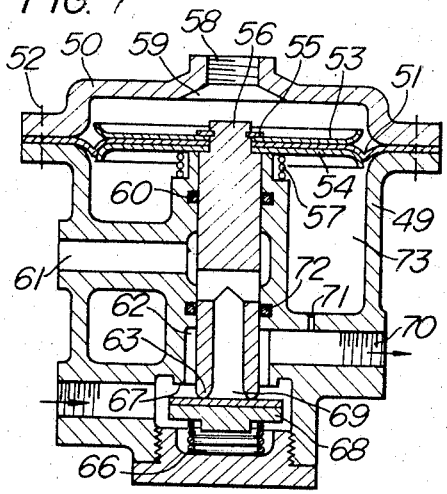
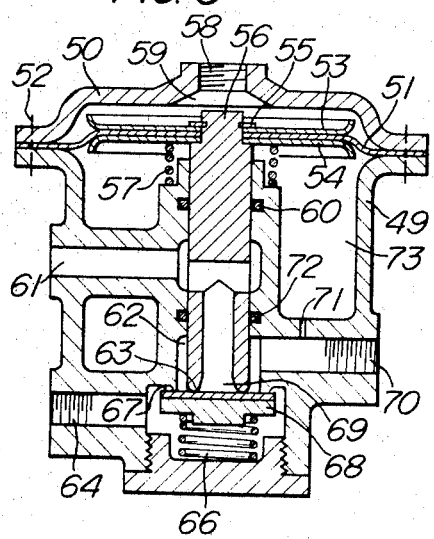
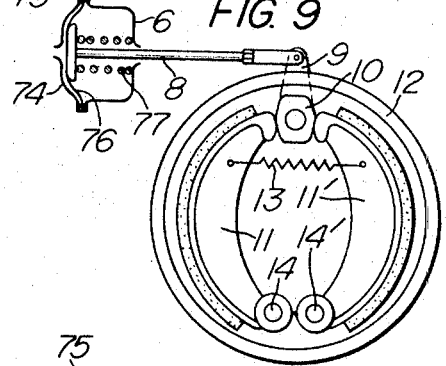
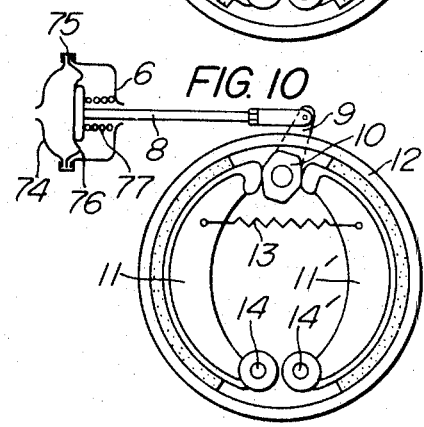

United States Patent Office 3,428,367
Patented Feb. 18, 1969

3,428,367
AIR BRAKE SYSTEM FOR AUTOMOBILES
Haruo Katayama, Saitama-ken, Japan, assignor to Sanwa Seiki Mfg., Co., Ltd., Saitama-ken, Japan, a corporation of Japan
Filed May 20, 1966, Ser. No. 551,702
Claims priority, application Japan, May 31, 1965, 40/31,715
U.S. Cl. 303—6　　　　　　　　　　　　　　2 Claims
Int. Cl. B60t 13/46

ABSTRACT OF THE DISCLOSURE

A brake system wherein the front brakes and rear brakes are each controlled by a separate relay self lapping valve. Each valve has a restricted passage to delay the balancing pressure fluid. The relay valves are operated by an operator-actuated self lapping valve which also has a restricted passage to delay the balancing pressure fluid. The above self lapping valve system delays the self lapping action to insure that all brake actuators apply the brakes to the desired pressure setting.

---

This invention relates to air brake systems for automobiles and is intended to provide a new and improved air brake system which affords an intensified and accelerated braking action and is simple in construction.

In general, air brakes for automobiles can give a large braking force compared with that of oil brakes but has conventionally involved a deficiency that the actual braking action upon depression of the brake pedal is usually obtainable only with a considerable time delay, requiring the driver to operate with a feeling different from that for oil brakes.

In view of this, the present invention is designed to reduce the delay in braking action while at the same time intensifying the braking force obtainable with the air brake system.

According to the present invention, this objective can be attained by incorporating improvements in construction of the pedal-operated control valve and of the relay valve normally arranged in the air conduit system associated with the rear wheels. The inventive improvements include the provision in both control and relay valves of an air chamber of a substantial volume and a throttling aperture for communicating the chamber with the air supply passage in the valve assembly on the output side thereof. By this means, a substantial time lapse is allowed between the actuation of the valve and its assuming a balanced state. With this arrangement, the control valve when actuated gives a signal pressure which has a peak value enabling it to be transmitted at an increased velocity to the relay valve, which in turn gives an output pressure exhibiting with a peak value in the initial stage of filling operation. This results in an improved braking efficiency and hence in a reduced brake stopping distance with the braking action occurring immediately upon depression of the brake pedal.

With use of control and relay valves of such improved construction and performance, it has been found that the objective of the present invention can be attained with further ease by employing such relay valve not only in association with the rear wheels but also in the air conduit system associated with front wheels to replace the quick-release valve conventionally used in the system and connecting each of the relay valves directly with the air reservoir tank and the control valve so as to be directly operated by the signal pressure from the latter. It is to be understood, however, that the use of a relay valve in place of the quick-release valve associated with front wheels is not always essential to the practicing of the present invention but it is also applicable with successful results to air brake systems of the type employing a quick-release valve and a relay valve in association with the front and rear wheels, respectively.

The foregoing and other objects, features and advantages of the present invention will become apparent from the following detailed description when taken in conjunction with the accompanying drawings, in which:

FIG. 6 is a cross-sectional view of the relay valve shown in FIG. 2 and illustrating it in its discharging position;

FIG. 7 is a view similar to FIG. 6, illustrating the relay valve in its air-supplying position;

FIG. 8 is a view similar to FIGS. 6 and 7, illustrating the relay valve in its balanced state;

FIG. 9 is a schematic side view illustrating one of the brake assemblies in its release position;

FIG. 10 is a view similar to FIG. 9, illustrating the brake assembly in its working position.

Figure 1:
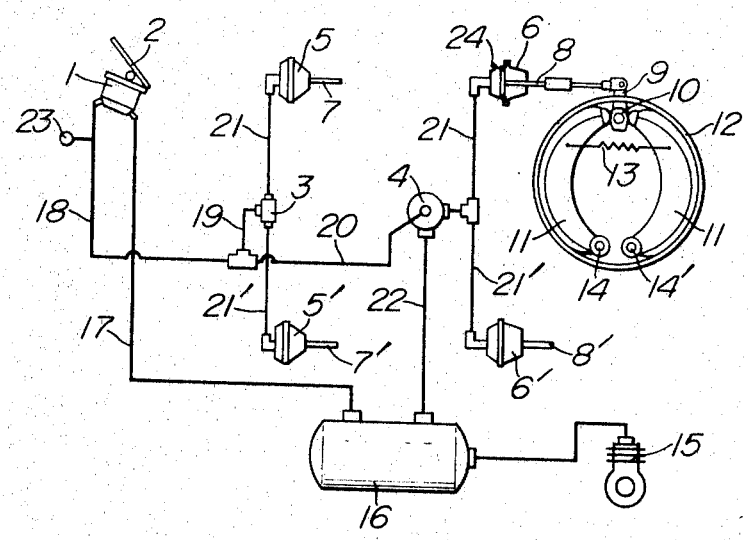
FIG. 1 is a schematic illustration of the air brake system for automobiles, which is currently in use.

Referring first to FIG. 1, which illustrates the conventional air brake system, compressed air from air compressor 15 is stored in a reservoir tank 16. A brake pedal 2 is operatively connected with a control valve 1 of the self lapping type and, when it is depressed to brake the car, air from the reservoir 16 is allowed to flow to a quick-release valve 3 through conduits 17, 18 and 19 and to relay valve 4 through conduits 17, 18 and 20. The quick-release valve 3 being arranged to allow passage therethrough of charging air, the air from conduit 19 flows through the quick-release valve 3 and hence through conduits 21 and 21' to enter respective brake chambers 5 and 5' associated with the right and left front wheels of the car so that the plungers or push rods 7 and 7' of the respective brake chambers are forced out to apply a braking force to the front wheels.

Figure 3:
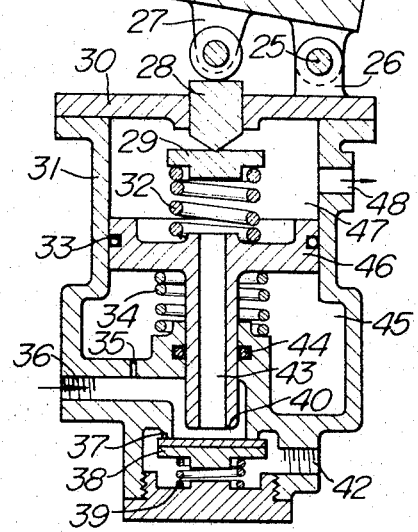
FIG. 3 is a cross-sectional view of the control valve shown in FIG. 2 and illustrating it in its discharging position.

The relay valve 4, which is also of the self lapping type, has an air-supply valve element incorporated therein as will be described hereinafter and, when it receives the output signal pressure of the control valve 1 through conduit 20, the air-supply valve element is caused to open to allow the air coming from reservoir 16 through a conduit 22 to proceed through conduits 21 and 21' to respective brake chambers 6 and 6' for the rear wheels so that the push rods or plungers 8 and 8' arranged in the respective brake chambers are forced out to apply a braking force to the respective rear wheels. The mechanisms for applying the braking force to the respective front and rear wheels are identical with each other and one form of such mechanisms is illustrated in FIG. 3. As illustrated, the mechanism includes a pivotal lever 9 connected with the plunger 8 and a cam 10 carried on the pivotal shaft of the lever 9. When the plunger 8 is forced out, the lever 9 and cam 10 are turned to expand brake shoes 11, 11', pivotally anchored at 14 and 14' by pin means, and thus press them against the brake drum 12 to produce a desired braking effect.

Figure 2:
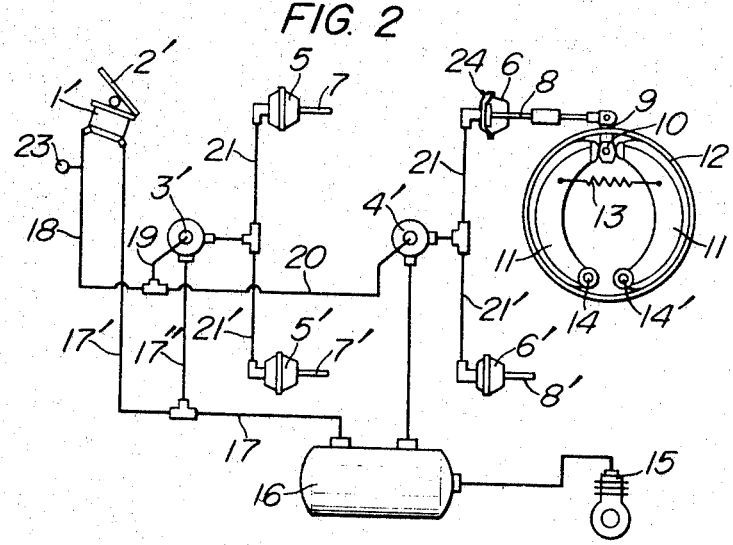
FIG. 2 is a similar illustration of one example of the air brake system for automobiles embodying the present invention.

Reference will next be made to FIG. 2, which illustrates an air brake system for automotive use embodying the present invention. Though the major distinguishing features of the air brake system from the conventional one lie in the construction and functional effect of a control valve 1′ and relay valves 8′ and 4′, the inventive system is also distinguishable from the conventional one shown in FIG. 1 by the fact that a relay valve 3′, similar to self lapping relay valve 4, is employed in place of the quick-release valve 3 used in the latter and that the air-supply line 17 from reservoir 16 is branched into conduits 17′ and 17″ respectively leading to the control valve 1′ and relay valve 3′.

The control valve 1′ and both relay valves 3′ and 4′ are of such a special construction that in operation it is delayed in assuming its balanced state thereby to allow passage of a markedly increased amount of air for speeding up the braking action, as will be described hereinafter in more detail with reference to FIGS. 3 to 5 and FIGS. 6 to 8, respectively.

Also, because of the use of the relay valve 3′ in place of the quick-release valve 3 as used in the conventional air brake system of FIG. 1, the amount of air supply through control valve 1′, which is only required to control relay valves 3′ and 4′, can be limited to a substantial extent. This apparently makes it possible to greatly increase the rate of pressure rise in the associated air conduit system and thus expedite the functioning of the relay valves thereby effectively to accelerate the braking action.

Figure 4:
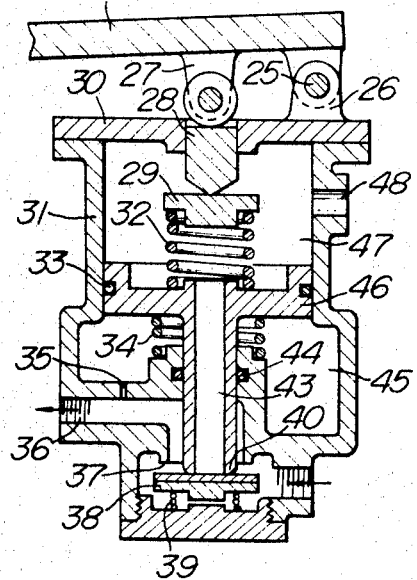
FIG. 4 is a view similar to FIG. 3, illustrating the control valve in its charging or air-supplying position.

The improved type of control valve will next be described in detail with reference to FIG. 3. The casing 31 of the control valve includes a cover 30 carrying a lug 26, to which the brake pedal 2 is pivoted at one end by means of a pin 25. Fitted in the casing cover 30 is a pusher 28 with which a depending lug 27 formed on the underside of the pedal 2 is held in contact so that, when pedal 2 is depressed at its free end to turn about the axis of pin 25, the lug 27 on the pedal acts to force down the pusher 28. A piston 46 is slidably fitted in the casing in sealed relation thereto with O-rings 33 and 44 arranged in the piston and casing, respectively. A main and a return spring 32 and 34 are arranged on and beneath the piston 46, respectively, the former spring having a spring rate higher than the latter one so that, when the pusher 28 is forced down, the piston 46 is also forced down against the combined resistance of the O-rings and return spring 34. As shown, the piston 46 has a downward extension through which a discharge aperture 43 is formed and which serves at the bottom end as a seat cooperable with an air-supply valve element 38, which is arranged in the bottom of the valve casing. Upon depression of pedal 2 the downward extension of the piston first engages at its bottom with the top surface of the air-supply valve element 38 to close the discharge aperture 43 and then forces down the valve element 38 against a spring biasing the latter upwardly until the valve parts are positioned as shown in FIG. 4. In this valve position, it will be noted that the air reaching the inlet port 42 of the valve is allowed to flow past the air-supply valve element 38 to leave the valve assembly through another port 36 formed on its output side. This valve position will be referred to hereinafter as "filling" or "air-supplying" position. It will be noted that the air leaving the control valve through its port 36 passes through conduits 18, 19 and 20 to reach relay valves 3′ and 4′ for actuation thereof.

Figure 5:
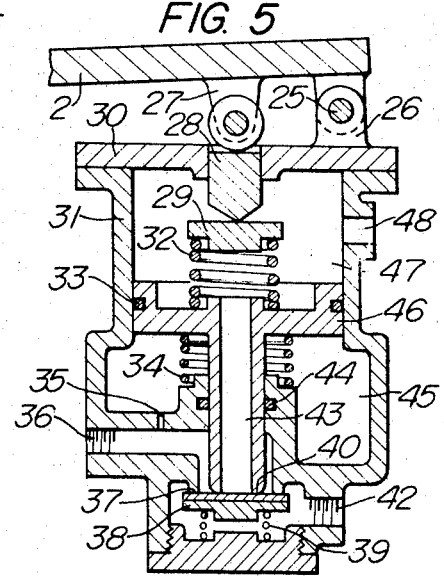
FIG. 5 is a view similar to FIGS. 3 and 4, illustrating the control valve in its balanced state.

Referring again to FIGS. 3 and 4, the piston 46 fitted in the valve casing 31 defines therein an air chamber 45 of a substantial volume, which is in communication with the air port 36 through a throttling aperture 35 to receive the air pressure therefrom. With this arrangement, it is to be understood that, as the air pressure in the chamber 45 is built up, the piston 46 is gradually forced back upwardly together with air-supply valve element 38, which is held in contact with the bottom end of the downward extension of the piston and that, when the force restoring the piston has grown to balance with the depressing force being applied to the top of the piston by means of the pedal, the air-suply valve element 38 reaches its seat 37 formed in the bottom of the valve casing to close the air passage between the air ports 42 and 36, as shown in FIG. 5. This valve position will be referred to hereinafter as "balanced" or self lapping position, that is, the position wherein the valve ports are lapped so that the inlet and exhaust connections are cut off from the outlet 36. This balancing action is automatically effected as the pressure of air introduced in the system through the control valve reaches a value predetermined by the force applied to the piston through the pedal 2. In other words, the balance effect is obtained as the air pressure in the chamber 45 acting upon the underside of piston 46 follows or varies with the pressure being built in the system on the output side of the control valve or the pressure in its air port 36.

Another important feature of the present invention is that the balancing process of following the air pressure being built in the system is restrained to a certain extent. Namely, because of the relatively large volume of the air chamber 45 and the limited cross section of the throttling aperture 35, the rise in pressure of the balancing air received in the chamber 45 is substantially delayed relative to the pressure rise in the air port 36 due to the throttling effect of the aperture 35. It has been found that satisfactory results can be obtained when the volume of air chamber 47 and the size of throttling aperture 35 communicating therewith are selected so that the pressure in air chamber 45 when air supply is started reaches a value of 1 kg./cm.$^2$ with a delay of from 0.01 to 0.04 second after the pressure in the air port 36 has reached the same value of 1 kg./cm.$^2$.

It will be understood that the delay of the valve in assuming its balanced position results in a correspondingly increased opening area of the air-supply valve 38 and an increased length of its opening period. This obviously is effective to expedite the building up of air pressure in the system on the output side of the control valve.

Figure 11:
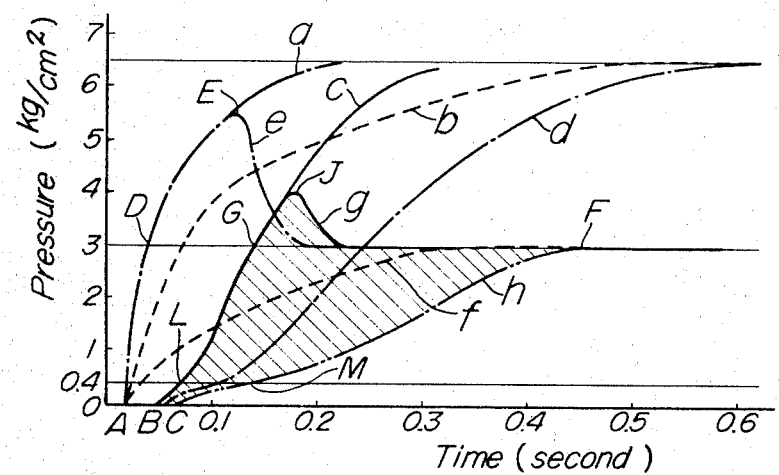
FIGS. 11 and 12 graphically illustrate the brake pressure characteristics of the inventive air brake system in comparison with those of the corresponding conventional air brake system.
Figure 12:
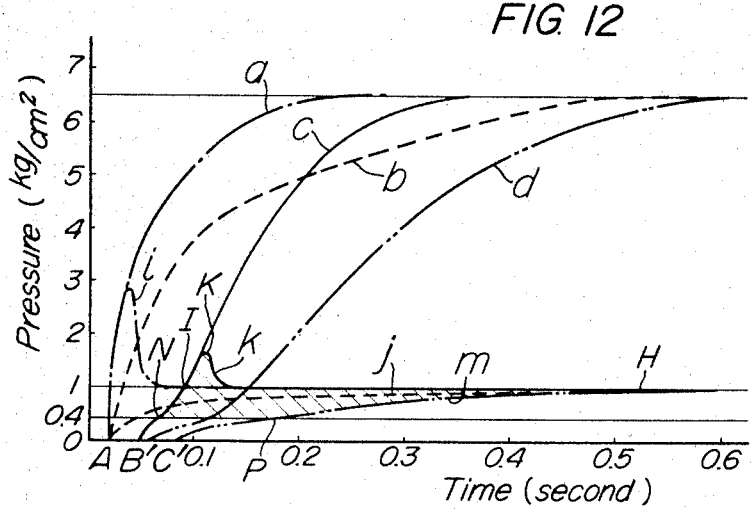

Reference will next be made to FIGS. 11 and 12, which illustrate some of experimental data obtained with the inventive and conventional air brake systems shown in FIGS. 2 and 1, respectively. In the experiments, the signal pressure or the controlling air pressure obtained from the control valve and the brake pressure acting in one of the brake chambers associated with rear wheels were measured. The curve $a$ illustrates the signal pressure measured at point 23 in the improved brake system shown in FIG. 2 while curve $b$ illustrates that measured at point 23 in the conventional brake system of FIG. 1.

In the two graphical illustrations, the origin O in the coordinate system represents the moment when the pedal was depressed. In both improved and conventional brake systems, the presure rise was found to start at point A or 0.02 second after the pedal depression, but a remarkable difference was observed between the two systems in the rate of pressure rise thus started. In other words, after the pedal operation the pressure in the improved system took only 0.025 second to reach a value of 6.5 kg./cm.$^2$ whereas in the conventional system 0.6 second was required to attain the same pressure value.

In FIG. 11, the curve $a$, represented by the thick one-dotted line, indicates the pressure rise obtained in the improved system when the pedal of the control valve was depresed so as to give a brake pressure of 3 kg./cm.$^2$. Though in the conventional system the brake pressure was reached in less than 0.01 second. In the case of the consame brake pressure of 3 kg./cm.$^2$ was attained in the improved system only in 0.325 second.

Referring next to FIG. 12, the thick one-dotted line $i$ indicates the behavior of the signal pressure in the improved system when operated to obtain a brake pressure of 1 kg./cm.$^2$ and it is indicated that the brake pressure was reached in less than 0.01 second. In the case of the conventional system, the signal pressure increased asymptotically approaching the level of 1 kg./cm.² as the control valve approached its balanced state, as indicated by the curve *j*. It is observed in this case that the pressure reached the value of 1 kg./cm.² only in approximately 0.5 second.

Curves *c* and *d* represent the pressure in the brake chamber, as measured at point 24 in the improved and conventional systems, respectively, when operated to obtain the brake pressure of 6.5 kg./cm.². Curves *g* and *h* illustrate the same pressure obtained in the respective systems for the brake pressure of 3 kg./cm.² and curves *k* and *m* for the brake pressure of 1 kg./cm.².

The effect upon the brake pressure of the rate of rise of the signal pressure from the control valve, when the brake pressure of 3 kg./cm.² is to be obtained, is indicated by the starting point of the brake pressure and the rate of its rise in both conventional and improved system. In FIG. 11, the starting point B of the brake pressure in the improved system appeared 0.02 second earlier than the starting point C in the case of the conventional system. Similarly, in FIG. 12, the starting point B' of the brake pressure in the improved system is approximately 0.04 second earlier than that C' in the conventional system.

The improved brake system is also featured by the fact that the signal pressure therein is held at a level higher than that in the conventional system to obtain a greater opening in the relay valves thereby to increase the rate of rise of the brake pressure. In other words, the present invention has an advantageous feature that the signal pressure therein is temporarily held at a level much higher than the required level of brake pressure owing to the delay of the control valve in assuming its balanced position. For example, in FIG. 11, the signal pressure rises high above the level of the brake pressure setting of 3 kg./cm.², passing through point D, to form a peak of pressure B.

Incidentally, the excess pressure at the peak E is automatically released to settle down to the set level of 3 kg./cm.² as the pressure acting upon the underside of the piston is balanced with a predetermined amount of delay, as illustrated.

Though the above description has been made for the brake pressure setting of 3 kg./cm.², the same result can also be obtained with any other brake pressure settings, including 1 kg./cm.² setting in the case of FIG. 12.

Reference will next be made to FIGS. 6 to 8, which illustrate one form of relay valve constructed according to the present invention. The relay valve illustrated includes a casing 49 and a cover 50 with a diaphragm 51 clamped air-tight therebetween by bolt means 52. The diaphragm 51 is embraced between a pair of dished plates 53, 54, which are secured to a discharge valve element 56 by means of clip rings 55. An axial bore 69 is formed in the valve element 56 for intercommunicating a discharge port 61 formed in the casing wall and a lobby 62 formed in the casing 49. A return spring 57 is arranged beneath the diaphragm 51 to serve the purpose of forcing the valve element 56 together with the diaphragm 51 back to its upper, normal position, overcoming the sliding resistance on the valve element. An air-supply valve element 68 is disposed in the bottom of the valve casing 49, as shown, and is normally pressed against its seat 67 under the bias of a valve spring 66 to close the air supply passage. A controlling air port 58 is formed in the casing cover 50 immediately above the diaphragm 51 so that, when a signal pressure reaches the air port 58, the diaphragm 51 is forced down together with the discharge valve element 56, which thus engages at its bottom end 63 with the air-supply valve element 68 to depress the latter. As the result, the air supply passage is opened to place the lobby 62 in communication with an air supply or inlet port 64 so that the air reaching the latter is directed through lobby 62 into another air port 70 formed in the valve casing, as shown in FIG. 7. This valve position will be referred to hereinafter as "filling" or "air-supplying" position.

Defined in the valve casing beneath the diaphragm 51 is an air chamber 73 having a substantial volume. An O-ring 60 is employed to seal the air chamber from the discharge port 61 and a throttling aperture 71 is formed in the bottom of the air chamber to communicate the latter with air port 70. In the air-supplying position shown in FIG. 7, the air directed through inlet port 64 and lobby 62 into the air port 70 is further directed into the conduit system associated with the brake chambers to raise the pressure therein. On this occasion, as the pressure in the air port 70 rises, part of the air therein is directed through the throttling aperture 71 into the air chamber 73 to raise the pressure therein. Thus, the pressure in the chamber acting upon the underside of the diaphragm 51 gradually lifts the latter with discharge valve element 56. This allows the air-supply valve element 68 to rise under the bias of return spring 66 while being held in pressure contact with the bottom end 63 of the discharge valve element. In this manner, the opening of the air-supply valve, that is, the distance between the top surface of the valve element 68 and its seat 67 is reduced by degrees and, when the force of pressure acting upon the top surface of the diaphragm 51 becomes equal to that acting upon the underside thereof, the air-supply valve element 68 is brought into sealing contact with its seat 67 to close the air supply passage, as shown in FIG. 8. In this position, the controlling air pressure acting upon the top surface of diaphragm 51 is in equilibrium with the filling air pressure, which is proportional to the controlling air pressure, and not only air supply but also air discharge through the relay valve is suspended with both of its air supply and discharge ports closed. This valve position will be referred to as "balanced" position.

Subsequently, when the pressure acting upon the top surface of the diaphragm 51 is released, the pressure on its underside becomes effective to force up the diaphragm with the discharge valve element 56 so that the bottom end 63 of the latter is separated from the surface of the air-supply valve element 68, as shown in FIG. 6. As the result, the air pressure in the brake chambers is released exteriorly of the system through the air port 70, axial bore 69 in the discharge valve element 56 and discharge port 61 of the relay valve. This valve position will be referred to as "discharging" or "releasing" position.

One of the advantageous features of the present invention is that the rate of air passage through the relay valve is increased to speed up the filling of air into brake chambers and hence the application of the braking pressure to the wheels. Such increase in rate of air passage is effected in the same principle as in the case of the control valve by delaying the balancing action of the relay valve on purpose as described below.

In the air-supplying position shown in FIG. 7, the rise in pressure in the air chamber 73 is restrained due to the throttling effect of throttling aperture 71 relative to the pressure rise in the air lines leading to the brake chambers. In other words, the relay valve is characterized in that the volume of the air chamber and the size of the throttling aperture communicating therewith are selected so that the pressure rise in the air chamber 73 is appropriately delayed relative to that in the region of air port 70, for example, by 0.01 to 0.05 second for the pressure rise of 1 kg./cm.².

Reference will again be made to FIGS. 11 and 12, which illustrate experimental data obtained with the inventive and conventional air brake systems.

In FIG. 11, the signal pressure obtained by operating the control valve to give a brake pressure of 3 kg./cm.² is represented by the thick one-dotted line *e* for the improved system and by the thick broken line *f* for the conventional one, as explained hereinbefore. Also, the brake pressure occurring upon operation of the relay valve receiving such signal pressure is represented by the thick solid line *g* for the improved system and by the thick two-dotted line *h* for the conventional system. As observed, there exists a wide difference between the two systems in mode of pressure rise. Namely, while in the conventional system the brake pressure of 3 kg./cm.² is only reached at point F or in approximately 0.45 second, the same brake pressure in the inventive system is reached at point G or in approximately 0.14 second. This means that the air brakes in the latter system can be rendered effective much more quickly than those in the former one.

In FIG. 12, the thick one-dotted line $i$ illustrates the signal pressure obtained in the improved brake system by operating the control valve so as to give a brake pressure of 1 kg./cm.² and the thick broken line $j$ illustrates that in the conventional system. The brake pressure produced by the resulting operation of the relay valve is represented by the thick solid line $k$ for the improved system and by the thick two-dotted line $m$ for the conventional system. In this case, also, the two systems are widely different from each other in mode of pressure rise. In the conventional system, the brake pressure of 1 kg./cm.² was nearly obtained in approximately 0.3 second but was fully established only at point H or in more than 0.5 second. In the case of the inventive system, however, the same brake pressure of 1 kg./cm.² was reached earlier at point I, i.e., in approximately 0.09 second.

Further, the improved relay valve of the present invention is given the same particular advantageous character as the inventive control valve. That is, the use of the improved relay valve is effective due to its delay in assuming the balanced state not only to increase the rate of rise of the brake pressure but to cause the pressure temporarily to rise beyond its set level to form a pressure peak J in FIG. 11 or K in FIG. 12. Such peak formation is effective to enhance the brake effect particularly at the initial stage of brake operation and thus to reduce the stopping distance of the car, as will readily be appreciated.

It is disclosed, for example, in a publication entitled "Theories of Automotive Engineering" by Hirao, Kondo, Watari and Yamamoto, issued from Sankaido, pp. 81 to 83, that the friction coefficient between the brake lining and brake drum decreases with increase in the sliding speed therebetween, and in general increases with the temperature in the range below the point where fading takes place. Described also in the publication is the change in drum temperature with time during the brake operation. It is noted from these known facts that the braking force at the initial stage of brake operation is very limited because of the relatively large sliding speed and the limited friction coefficient due to the low temperature of the sliding region at the very start or initial stage of brake operation. It follows, therefore, that in the ideal mode of brake operation the brake pressure at the very start of brake application should be raised so as to compensate for the limited initial friction coefficient. According to the present invention, this objective is attained by forming a peak in the brake pressure, as described hereinbefore.

As observed from the brake pressure curves $g$, $h$, $k$ and $m$ in FIGS. 11 and 12, the brake shoes contacting the brake drum become effective to brake the latter only after the brake pressure has reached a value of approximately 0.4 kg./cm.². The pressure before reaching this value is mostly consumed in compressing the return spring 77 in the brake chamber 6 and expanding the shoe-restoring spring 13, as seen in FIGS. 9 and 10.

In the case of the brake pressure setting of 3 kg./cm.² shown in FIG. 11, the brake system including the inventive relay valve is actually rendered effective at point L or 0.07 second after the pedal operation and the one including the conventional relay valve at point M or 0.135 second after the pedal operation. That is, the length of free running time between the pedal depression and the actual start of braking action in the inventive system is about half that length of the conventional system, being 0.065 second shorter than the latter.

Similarly, in the case of the brake pressure setting of 1 kg./cm.² shown in FIG. 12, the system employing the inventive relay valve becomes effective at N or 0.07 second after the pedal operation and the one including the conventional relay valve at P or after 0.17 second after the pedal depression. In other words, the length of free running time of the inventive system in this case is about half that length of the conventional system, being 0.1 second shorter than the latter.

To summarize the improved air brake system of the present invention is capable of functioning with a substantially reduced time lag and hence giving a correspondingly limited stopping distance. The outline of the inventive feature will be obvious by examining the shaded regions in FIGS. 11 and 12. In the case of the conventional system, the net brake pressure at each instant is indicated by the distance between the pressure level of 0.4 kg./cm.² and the brake pressure curve $h$ or $m$ and that in the inventive system by the distance between the same pressure level of 0.4 kg./cm.² and the brake pressure curve $g$ or $k$. Therefore, the shaded regions in FIGS. 11 and 12 which are enclosed, respectively, by the line of 0.4 kg./cm.² and brake pressure curves $g$, $h$ and by the line of 0.4 kg./cm.² and brake pressure curves $k$, $m$, indicate how fast the brake pressure in the inventive system grows effective and how large it grows in comparison with the conventional system. Also, the area of such shaded regions corresponds to the increase in braking torque or in amount of work done in the inventive system as compared with the conventional one and thus gives the measure of the inventive effect of reducing the stopping distance. It will be appreciated from the foregoing that the improvements of the present invention are effective to make the actual braking action to start earlier and that with an increased braking force thereby to reduce the brake stopping distance. Viewing from the driver's standpoint, the substantial reduction in time lag of the braking action and the fast build-up of the braking force enable the brake system effectively to start its braking action upon the vehicle wheels as soon as the brake pedal is depressed by the driver to start the system. Thus, according to the present invention, the brake operation is made extremely easy and reliable and the driving safety is effectively enhanced.

What is claimed is:

1. A brake system comprising front wheel brakes and rear wheel brakes, a source of fluid under pressure, first conduit means connecting said source to the front brakes, second conduit means connecting said source to the rear brakes, a self lapping relay valve in each of said conduit means, an operator-actuated self lapping control valve, said control valve and each of said relay valves comprising a pressure supply port, an outlet port and an exhaust port, fluid flow control means for controlling the flow of fluid from the supply port to the outlet port and from the outlet port to the exhaust port, a pressure responsive means in a balancing chamber to return the fluid flow control means to lapped position, and a calibrated restricted passage between the balancing chamber and the outlet port, said relay valves having their supply ports connected to the source and their outlet ports to the brakes, a third conduit means connecting said source to said control valve, pressure responsive operating means for each relay valve connected to the fluid flow control means for operating the same, fourth conduit means connecting each of said pressure responsive operating means to the outlet port of said control valve, whereby actuation of the control valve operates the relay valves to valve supply fluid to the brakes, and the self lapping action of each valve is responsive to the pressure variations at its outlet port.

2. A brake system as set forth in claim 1, wherein the restricted calibrated passage in the control valve is of a dimension to delay the flow of balancing pressure fluid to lap the fluid flow control means from about 0.01 to 0.04 second for a given brake pressure setting, and the restricted calibrated passage in each relay valve is of a dimension to delay the flow of balancing pressure fluid to lap the fluid flow control means from about 0.01 to 0.05 second for the same brake pressure setting.

References Cited

UNITED STATES PATENTS

| 2,410,966 | 11/1946 | Eaton | 303—54 |
| 2,543,099 | 2/1951 | Eaton | 303—30 |
| 2,971,799 | 2/1961 | Knecht | 303—54 |

DUANE A. REGER, *Primary Examiner.*

U.S. Cl X.R.

303—30, 40, 54